United States Patent
Foye et al.

(10) Patent No.: US 9,525,369 B2
(45) Date of Patent: Dec. 20, 2016

(54) REVERSE ROTATION BRAKING FOR A PM MOTOR

(71) Applicant: TRANE INTERNATIONAL INC., Piscataway, NJ (US)

(72) Inventors: David M. Foye, LaCrosse, WI (US); Victor R. Stefanovic, Afton, VA (US)

(73) Assignee: TRANE INTERNATIONAL INC., Davidson, NC (US)

( * ) Notice: Subject to any disclaimer, the term of this patent is extended or adjusted under 35 U.S.C. 154(b) by 0 days.

(21) Appl. No.: 14/665,402

(22) Filed: Mar. 23, 2015

(65) Prior Publication Data

US 2015/0263655 A1  Sep. 17, 2015

Related U.S. Application Data

(63) Continuation of application No. 13/211,491, filed on Aug. 17, 2011, now Pat. No. 8,988,028.

(51) Int. Cl.
*H02P 6/12* (2006.01)
*H02P 6/24* (2006.01)
(Continued)

(52) U.S. Cl.
CPC .................. *H02P 6/12* (2013.01); *F04B 35/04* (2013.01); *F04B 49/06* (2013.01); *H02P 3/18* (2013.01);
(Continued)

(58) Field of Classification Search
CPC ..................................... H02P 6/12; H02P 6/24
(Continued)

(56) References Cited

U.S. PATENT DOCUMENTS

| | | |
|---|---|---|
| 4,410,845 A | 10/1983 | Lockyear |
| 5,744,921 A | 4/1998 | Makaran |

(Continued)

FOREIGN PATENT DOCUMENTS

| | | |
|---|---|---|
| KR | 10-2003-0010315 | 2/2003 |
| KR | 10-2006-0081057 | 7/2006 |

(Continued)

OTHER PUBLICATIONS

International Preliminary Report on Patentability and Written Opinion for International Application No. PCT/US2012/050860 dated Feb. 18, 2014, 9 pgs.

(Continued)

*Primary Examiner* — Kawing Chan
(74) *Attorney, Agent, or Firm* — Hamre, Schumann, Mueller & Larson, P.C.

(57) ABSTRACT

A system includes a motor, an inverter bridge, a voltage detection circuit, and a controller. The motor has a stator and a rotor. The inverter bridge is configured to provide a voltage to the stator, and includes a first switch connected in a series-type relationship with a second switch, a first diode coupled across the first switch, and a second diode coupled across the second switch. The voltage detection circuit is configured to detect a back EMF voltage in the winding. The controller is configured to control the first switch and the second switch to drive the motor, and to receive an indication of the back EMF voltage in the winding from the voltage detection circuit. The controller is also configured to determine a fault has occurred, and to drive one of the first switch and the second switch when a fault has occurred.

9 Claims, 4 Drawing Sheets

(51) Int. Cl.
   *F04B 35/04*  (2006.01)
   *F04B 49/06*  (2006.01)
   *H02P 3/22*   (2006.01)
   *H02P 3/18*   (2006.01)
   *H02P 6/18*   (2016.01)

(52) U.S. Cl.
   CPC . *H02P 3/22* (2013.01); *H02P 6/24* (2013.01); *H02P 29/0241* (2016.02); *F04B 2203/0202* (2013.01); *H02P 6/182* (2013.01)

(58) Field of Classification Search
   USPC .............. 318/400.34, 400.32, 400.01, 700
   See application file for complete search history.

(56) References Cited

U.S. PATENT DOCUMENTS

| | | | |
|---|---|---|---|
| 5,820,349 | A | 10/1998 | Caillat |
| 6,369,534 | B1 | 4/2002 | Menegoli |
| 7,234,311 | B2 | 6/2007 | Lifson et al. |
| 7,300,257 | B2 | 11/2007 | Lifson et al. |
| 2005/0030002 | A1 | 2/2005 | Shao et al. |
| 2006/0076911 | A1* | 4/2006 | Kuroshima ............ H02P 6/182 318/400.04 |
| 2006/0181239 | A1 | 8/2006 | Galli et al. |
| 2008/0025476 | A1 | 1/2008 | Noessing et al. |

FOREIGN PATENT DOCUMENTS

| | | |
|---|---|---|
| KR | 10-0977085 | 8/2010 |
| WO | 9905779 | 2/1999 |

OTHER PUBLICATIONS

International Search Report and Written Opinion for International Application No. PCT/US2012/050860 dated Feb. 25, 2013, 10 pgs.
Extended European Search Report, Feb. 10, 2016; European Patent Application No. 12824040.5 (8 pages).

* cited by examiner

REVERSE ROTATION BRAKING FOR A PM MOTOR

BACKGROUND

The invention relates to motor driven compressors used in refrigeration systems. Specifically, the invention relates to preventing the reverse rotation of a motor driving a compressor when a fault condition occurs.

Many compressors are driven by permanent magnet (PM) motors. PM motors act as generators when their rotors are driven by external forces and not by their stators. Pressure of a refrigerant in a refrigeration system can cause a compressor to rotate in a reverse direction when a fault occurs. This reverse rotation of the compressor results in the PM motor becoming a generator. If the reverse rotation is significant enough, the PM motor can produce voltage and current having magnitudes sufficient to damage components of the motor and/or control system.

SUMMARY

In one construction, the invention provides a system for operating a compressor. The system includes a motor, an inverter bridge, a voltage detection circuit, and a controller. The motor has a stator and a rotor. The inverter bridge is configured to provide a voltage to the stator, and includes a first switch connected in a series-type relationship with a second switch, a first diode coupled across the first switch, and a second diode coupled across the second switch. The voltage detection circuit is configured to detect a back EMF voltage in the winding. The controller is coupled to the inverter bridge and the voltage detection circuit. The controller is configured to control the first switch and the second switch to drive the motor, and to receive an indication of the back EMF voltage in the winding from the voltage detection circuit. The controller is also configured to determine a fault has occurred, and to drive the first switch or the second switch when a fault has occurred.

In another construction the invention provides a method of reducing a reverse rotation of a motor driving a compressor. The method includes detecting a voltage of a winding of the motor, determining that a fault has occurred based on the detected voltage, and driving a first switch or a second switch continuously when the fault is detected.

Other aspects of the invention will become apparent by consideration of the detailed description and accompanying drawings.

DETAILED DESCRIPTION

Before any constructions of the invention are explained in detail, it is to be understood that the invention is not limited in its application to the details of construction and the arrangement of components set forth in the following description or illustrated in the following drawings. The invention is capable of other constructions and of being practiced or of being carried out in various ways.

Figure 1:
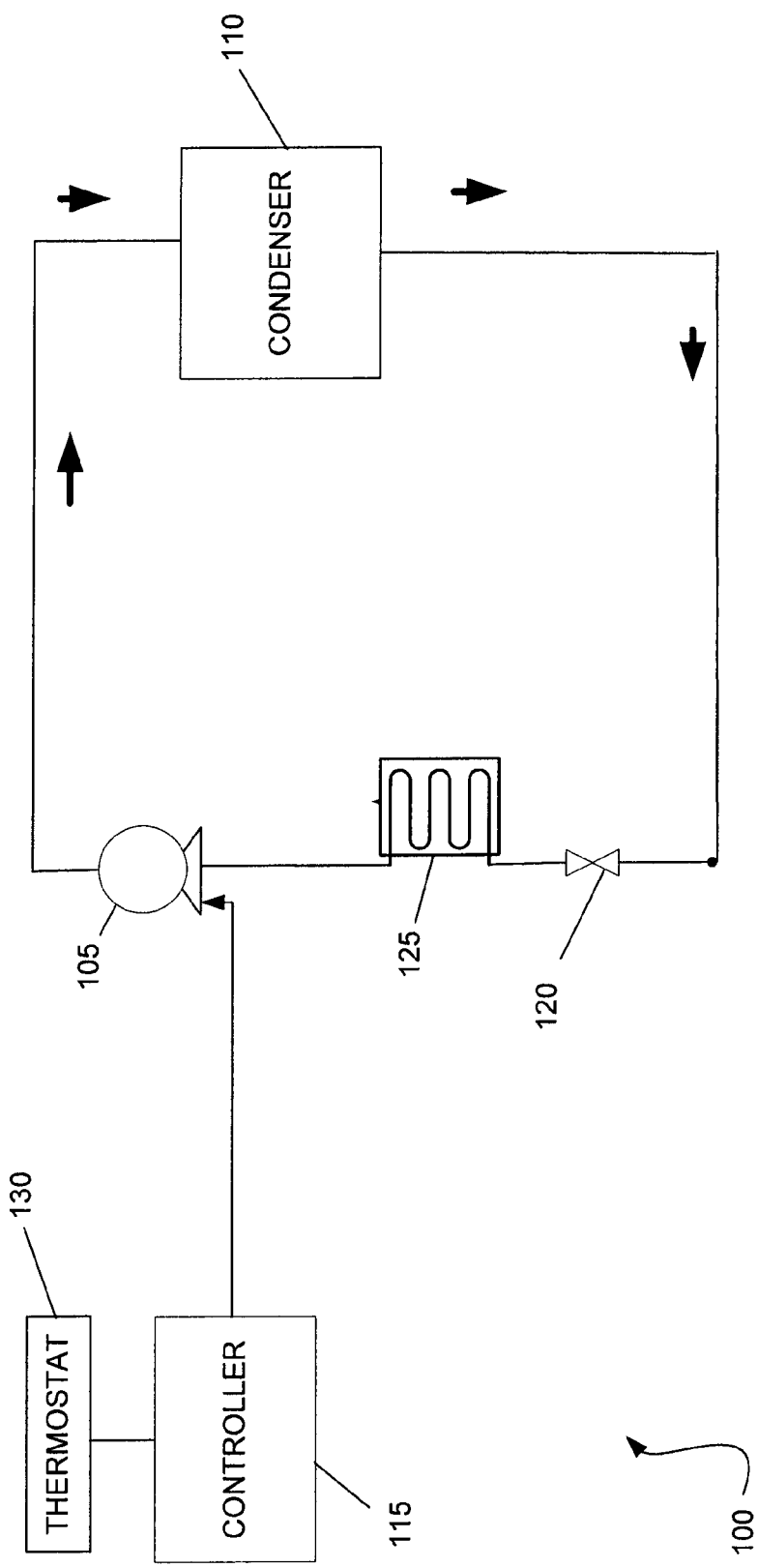
FIG. 1 is a schematic diagram of a refrigeration unit including a compressor driven by a PM motor.

FIG. 1 is a block diagram of a cooling system 100 (e.g., a residential air-conditioner). The system 100 includes a compressor 105, a condenser 110, a controller 115, an expansion valve 120, an evaporator 125, and a thermostat 130.

The controller 115 receives an indication from the thermostat 130 whether cooling is needed (e.g., ambient temperature is above a temperature set point). If cooling is needed, the controller 115 determines if the compressor 105 can be turned on based on a cycling scheme designed to reduce wear and tear on the compressor 105.

When the controller 115 turns the compressor 105 on, the compressor 105 compresses a refrigerant in the cooling system 100 to provide cooling capacity for the system 100. The refrigerant flows through piping to the condenser 110, which condenses the refrigerant into a liquid. The refrigerant continues on to the expansion valve 120. The expansion valve 120 causes the refrigerant to expand and transform into a gas. This process occurs as the refrigerant passes through the evaporator 125. As this happens, the refrigerant, in the evaporator 125, removes heat from the air surrounding the evaporator 125, resulting in the air being cooled. The refrigerant then continues on back to the compressor 105.

Figure 2:
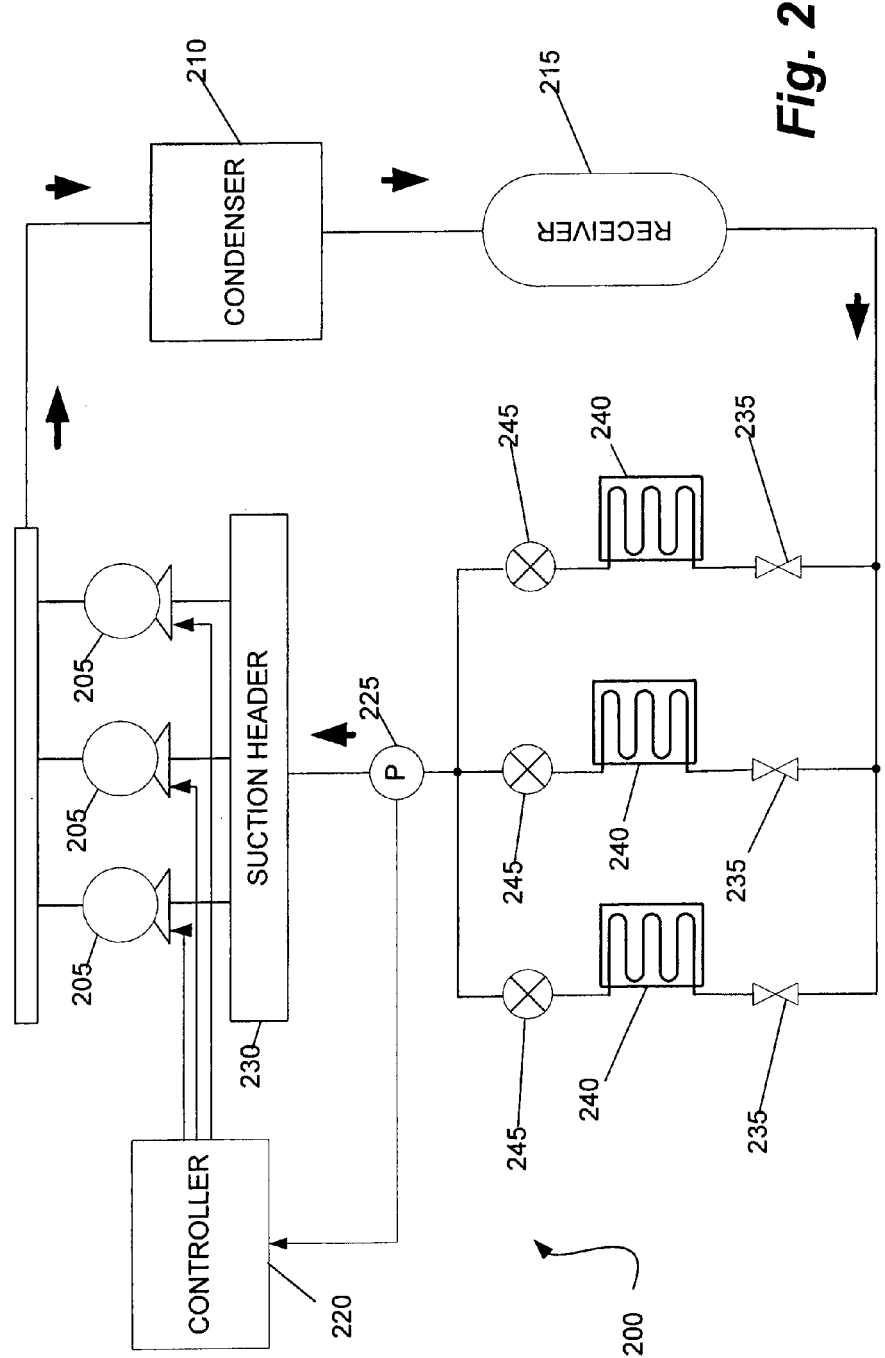
FIG. 2 is schematic diagram of a refrigeration unit including a plurality of compressors driven by PM motors.

FIG. 2 is a block diagram of an exemplary large-scale cooling system 200 (e.g., for cooling a commercial building, for cooling a plurality of refrigerated display cases, etc.). The cooling system 200 includes at least one compressor 205, a condenser 210, a receiver 215, a controller 220, a pressure sensor 225, a suction header 230, a plurality of expansion valves 235, a plurality of evaporators 240, and a plurality of pressure regulators 245. One or more temperature sensors may be used to detect the temperature of an area cooled by an evaporator 240 (e.g., a display case). The controller 220 receives an indication of the temperature of the area from the sensor, and controls components (e.g., the pressure regulators 245) of the system 200 based on the temperature.

In the construction shown, the controller 220 receives an indication of the suction pressure from a pressure sensor 225. The controller 220 includes one or more outputs for controlling the compressors 205. The controller 220 outputs can be digital outputs for controlling one or more fixed speed compressors 205 (i.e., on or off) and/or can be analog outputs for controlling one or more variable speed compressors 205 (i.e., 0% to 100%).

The compressor 205 compresses a refrigerant in the cooling system 200 to provide cooling capacity for the system. In a cooling system 200 with more than one compressor 205, the compressors 205 can turn on and off at the same or different times to meet the demand required by the system. In some constructions, all of the compressors 205 are of one or more fixed capacities, and the controller 220 stages or loads the compressors 205 into the system as necessary. In other constructions, one or more of the compressors 205 has a variable capacity. As system demand changes, the output of the variable compressor 205 can be modified to meet the demand. When the variable compressor 205 is running at a predetermined threshold of its capacity (e.g., 85% or 15%), another compressor 205 can be staged in or out of the system, and the output of the variable compressor 205 modified, to meet the demand.

In the cooling system 200, refrigerant flows through common piping to a suction header 230. The suction header 230 returns the refrigerant in the system to the compressors 205 operating in the system. In a cooling system, the relationship between pressure and temperature can be used to control the cooling capacity of the cooling system. Different operating conditions may make it impractical to control the compressors 205 based on individual sensed temperatures. Instead, a pressure of the refrigerant at the suction header 230 can indicate the maximum cooling capacity of the system 200 and can be used to control the operation of the compressors 205.

The pressure of the refrigerant is controlled by a respective pressure regulator 245. The pressure regulators 245 maintain the cooling capacity for each expansion valve 235/evaporator 240 combination by adjusting the pressure of the refrigerant in the evaporator 240. To increase the temperature, the pressure regulator 245 can partially or completely close to increase the pressure of the refrigerant in the evaporator 240. To reduce the temperature, the pressure regulator 245 opens to reduce the pressure of the refrigerant in the evaporator 240. If the cooling capacity of the system 200 is not high enough to achieve a desired temperature, the pressure regulator 245 can open completely, but the temperature will only go as low as the cooling capacity of the commercial refrigeration system.

The pressure sensor 225 is located in the common pipe leading to the suction header 230, and senses the pressure of the refrigerant before it enters the suction header. As discussed above, the pressure of the refrigerant relates directly to a temperature. The sensed pressure, therefore, is indicative of the maximum cooling capacity of the commercial refrigeration system 200. By running the compressors 205, such that the sensed suction pressure is at or below the pressure that corresponds to the lowest temperature set-point in the system, the system 200 can ensure that enough cooling capacity exists to meet the demands of the cooling system 200.

As more cooling is needed, additional compressors 205 are turned on. When less cooling is needed, compressors 205 are unloaded. Due to the wear and tear on the compressors 205, and the contactors, of turning on and off the compressors 205, cycling schemes have been developed to reduce the amount of wear and tear, and to distribute the wear and tear over all of the compressors 205. As part of these schemes, when a compressor 205 is turned on, it remains on for a predetermined minimum time period (e.g., three minutes). As such, should less cooling be needed before the time period expires, the compressor 205 continues to run, and reduces the efficiency of the system 200. Likewise, should a compressor 205 be cycled off, it is left off for a predetermined minimum time period (e.g., three minutes). The compressor 205 remains off at least until the time period expires, even if the system requires additional cooling, reducing the performance of the system.

Figure 3:
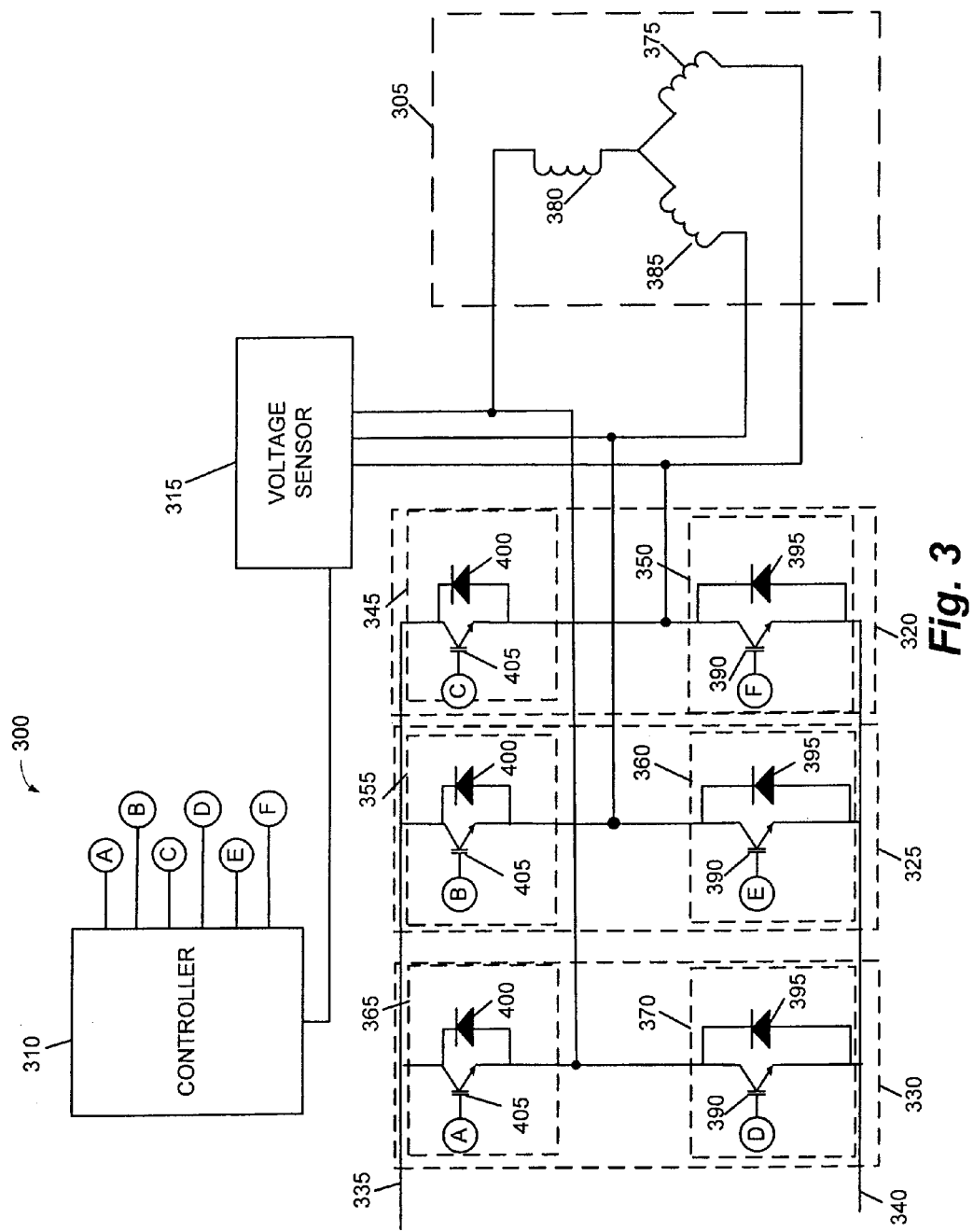
FIG. 3 is a schematic diagram of the system used to brake a motor driving a compressor.

FIG. 3 shows a schematic diagram for a system 300 used for operating a PM motor 305 (e.g., a PM synchronous motor, a brushless DC motor, etc.) to drive the compressors 105/205. The system 300 includes a controller 310, a voltage sensor 315, a first-phase inverter leg 320, a second-phase inverter leg 325, a third-phase-inverter leg 330, a first DC bus 335 and a second DC bus 340. The first-phase inverter leg 320 has an upper element 345 and a lower element 350, both of which are electrically connected in a "series-type" relationship between the first DC bus 335 and the second DC bus 340. The second-phase inverter leg 325 has an upper element 355 and a lower element 360, both of which are electrically connected in a series-type relationship between the first DC bus 335 and the second DC bus 340. The third-phase inverter leg 330 has an upper element 365 and a lower element 370, both of which are electrically connected in a series-type relationship between the first DC bus 335 and the second DC bus 340. The inverter legs 320, 325, and 330 described above are also referred to as inverter branches. In other constructions other inverter configurations are used.

The system 300 also includes a three-phase PM motor connected in a wye configuration. Other constructions (e.g., a delta configuration) are also possible. A first phase winding 375 is connected between the upper and lower elements 345 and 350. A second phase winding 380 is connected between the upper and lower elements 365 and 370. A third phase winding 385 is connected between the upper and lower elements 355 and 360.

Each lower element 350, 360, and 370 includes a respective switch 390. In the construction shown, the switch 390 is an insulated gate bipolar transistor (IGBT) having a collector coupled to a respective upper element 345, 355, or 365 and an emitter coupled to the second DC bus 340. Each lower element 350, 360, and 370 also includes a diode 395 having a cathode coupled to the respective upper element 345, 355, or 365, and an anode coupled to the second DC bus 340.

The upper elements 345, 355, and 365 each include a respective diode 400 having an anode coupled to the respective lower elements 350, 360, and 370, and a cathode coupled to the first DC bus 335. Each of the upper elements 345, 355, and 365 include a switch 405 (e.g., an IGBT) having an emitter connected to the respective lower element 350, 360, and 370, and a collector coupled to the DC bus 335.

The elements 345, 350, 355, 360, 365, and 370 are controlled by the controller 310 in a known manner to turn the motor 305. In the construction shown, the voltage sensor 315 senses the voltage across each of the windings 375, 380, 385 and provides an indication of the sensed voltage to the controller 310.

The controller 310 powers the windings 375, 380, and 385 to rotate the PM motor. The controller 310 chooses which phase windings to power based on the voltage readings sensed by the voltage sensor. The continuous turning on and off of the switches causes the motor to rotate in a forward direction, resulting in the motor 305 driving the compressor 105. In some instances, when a fault occurs, pressure of the refrigerant in the refrigeration system 100 can cause the compressor 105 to rapidly decrease its speed and to start rotating in a reverse direction. This causes the motor 305 to also rotate in a reverse direction. Rotation of the motor 305 in the reverse direction turns the motor 305 into a generator. The generator may produce current and voltage sufficiently large enough to damage components of the motor 305 or controller 300. In addition, reverse rotation may cause physical damage to one or more components of the system 300.

Figure 4:
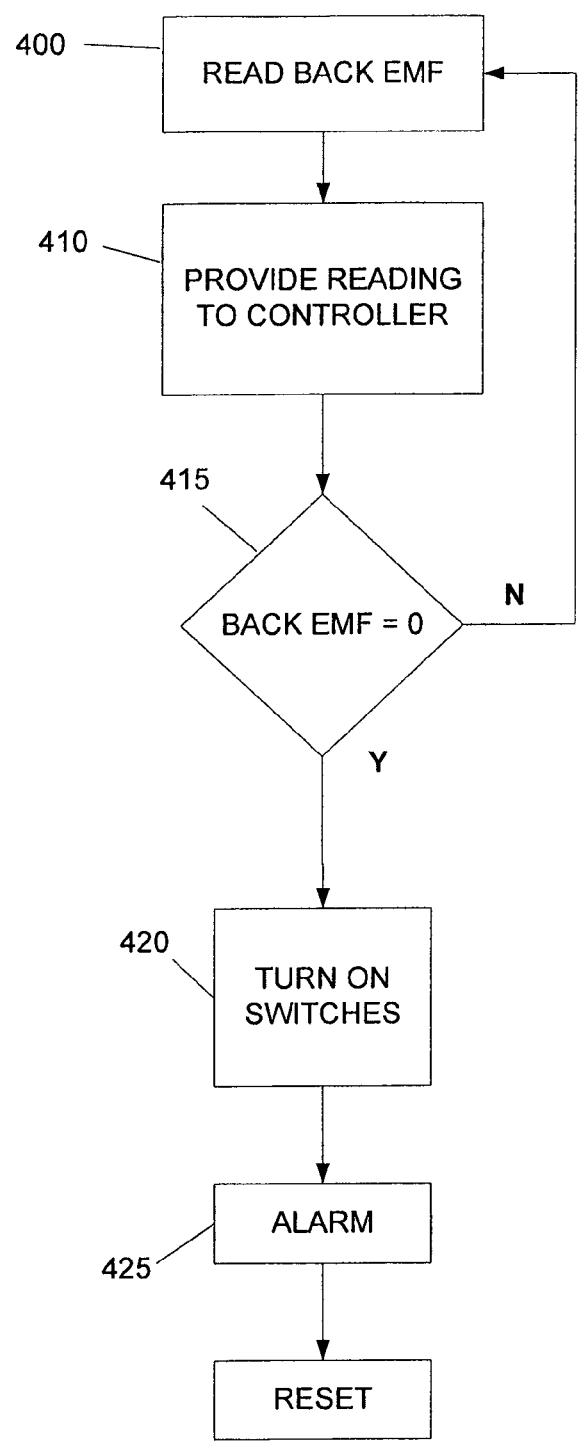
FIG. 4 is flow chart illustrating the process and steps taken to brake a motor driving a compressor.

FIG. 4 shows a process for preventing back pressure in the refrigeration system 100/200 from rotating the motor 205/305 in a reverse direction, in the event of a fault.

The voltage sensor 315 detects the back EMF on each of the three phase windings 375, 380, and 385 (step 400), and provides an indication of the back EMF to the controller 310 (step 410). In the construction shown, the voltage sensor 315 communicates this data serially to the controller 310. In other constructions, the voltage sensor 310 provides the indication to the controller 310 via other methods (e.g., individual analog signals). When the system 100/200 experiences a fault, the existing condenser pressure may cause the compressors 105/205 to slow and eventually stop. At this point no back EMF is being generated in the windings 375, 380, and 385, and the voltage sensor 310 senses this condition and sends the data to the controller 315.

The controller 310 checks if back EMF voltage in all of the phase windings 375, 380, and 385 is zero (step 415). If there is no back EMF, the controller 310 determines that a fault has occurred. The controller 310 then turns on all of the lower switches 390 or all of the upper switches 405 (step 420). Turning on all of the lower switches 390 or all of the upper switches 405 causes a short circuit across the windings 375, 380, and 385. If the motor is rotating due to back pressure, voltages are induced in the stator windings, causing a short circuit current to flow. The short circuit current exerts a braking force on a rotor of the motor 305, and limits reverse rotation of the motor 305. In a case where the fault is caused by a loss of mains power, a separate power source is required for the controller 310 and for the gates A-F of the switches 390/405.

After turning on the lower switches 390 or the upper switches 405, the controller 310 executes an alarm (step 425). The alarm can be an audio indicator, a visual indicator, or a combination thereof.

The system 300 is manually reset in the case of a fault or an error detected by the controller 310, and includes turning off the alarm that was turned on (step 430). The invention prevents the motor 305 from rotating in reverse and generating voltage and current sufficient to damage components of the motor 305 or the control system 300. Thus, upon correcting the fault, the system 300 is able to operate again without the time and cost of replacing components of the motor 305 or system 300.

Various features and advantages of the invention are set forth in the following claims.

What is claimed is:

1. A system for operating a compressor, the system comprising:
   a motor having a winding and a rotor;
   an inverter bridge configured to provide a voltage to the winding, the inverter bridge including a first switch connected in a series-type relationship with a second switch, a first diode coupled across the first switch, and a second diode coupled across the second switch;
   a voltage detection circuit configured to detect a back EMF voltage value in the winding; and
   a controller coupled to the inverter bridge and the voltage detection circuit, the controller configured to control the first switch and the second switch to drive the motor, configured to receive the back EMF voltage value in the winding from the voltage detection circuit, configured to determine a fault has occurred when the detected back EMF voltage value in the winding equals about zero, by a condition indicative of reverse rotation, and configured to drive one of the first switch and the second switch on when a fault has occurred is determined, so as to induce a voltage in the winding and cause a short circuit current to flow,
   wherein driving one of the first switch and the second switch on causes the short circuit current to exert a braking force on the rotor,
   wherein the braking force reduces a rate at which the rotor rotates, prevents the motor from producing a voltage and a current sufficient to damage components of the system, and reduces reverse rotation of the motor, and
   wherein the braking force stops the rotor from rotating.

2. The system of claim 1, wherein the motor includes a second winding, the system further comprising a second inverter bridge configured to provide a voltage to the second winding, the second inverter bridge including a third switch connected in a series-type relationship with a fourth switch, a third diode coupled across the third switch, and a fourth diode coupled across the fourth switch.

3. The system of claim 2, wherein the controller is further configured to drive the first switch and the third switch or the second switch and the fourth switch when a fault has occurred.

4. The system of claim 3, wherein the motor includes a third winding, the system further comprising a third inverter bridge configured to provide a voltage to the third winding, the third inverter bridge including a fifth switch connected in a series-type relationship with a sixth switch, a fifth diode coupled across the fifth switch, and a sixth diode coupled across the sixth switch.

5. The system of claim 4, wherein the controller is further configured to drive the first switch, the third switch, and the fifth switch or the second switch, the fourth switch, and the sixth switch when a fault has occurred.

6. The system of claim 1, wherein the first switch and the second switch are insulated gate bipolar transistors (IGBT).

7. A method of reducing a reverse rotation of a motor driving a compressor, the method comprising:
   detecting a back EMF voltage value of a winding of the motor;
   determining that a fault has occurred when the detected back EMF voltage value in the winding equals about zero, by a condition indicative of reverse rotation; and
   driving one of a first switch and a second switch on continuously when the fault is detected to induce a voltage in the winding and cause a short circuit current to flow,
   wherein driving one of the first switch and the second switch on includes the short circuit current exerting a braking force on the rotor,
   wherein the braking force reduces a rate at which the rotor rotates, prevents the motor from producing a voltage and a current sufficient to damage components of the system, and reduces reverse rotation of the motor, and
   wherein the braking force stops the rotor from rotating.

8. The method of claim 7, further comprising driving a third switch continuously when driving the first switch continuously or driving a fourth switch continuously when driving the second switch continuously.

9. The method of claim 8, further comprising driving a fifth switch continuously when driving the first switch and the third switch continuously or driving a sixth switch continuously when driving the second switch and the fourth switch continuously.

* * * * *